United States Patent [19]
Field

[11] Patent Number: 4,989,534
[45] Date of Patent: Feb. 5, 1991

[54] BOAT HULL HAVING STEPPED UNDERSIDE

[76] Inventor: Leonard E. Field, Steiglitz Wharf Road, Woongoolba Qld 4207, Australia

[21] Appl. No.: 402,834

[22] Filed: Sep. 1, 1989

[30] Foreign Application Priority Data

Sep. 1, 1989 [AU] Australia .............................. PJ0200

[51] Int. Cl.$^5$ .............................................. B63B 1/32
[52] U.S. Cl. .................................. 114/289; 114/67 A
[58] Field of Search ............... 114/61, 67 A, 290, 291, 114/289

[56] References Cited

U.S. PATENT DOCUMENTS

| | | | |
|---|---|---|---|
| 2,172,674 | 9/1939 | Frost | 114/289 |
| 3,547,064 | 12/1970 | Glass | 114/291 |
| 4,231,314 | 11/1980 | Peters | 114/289 |

Primary Examiner—Joseph F. Peters, Jr.
Assistant Examiner—Jesus D. Sotelo
Attorney, Agent, or Firm—Renner, Otto, Boisselle & Sklar

[57] ABSTRACT

A boat hull having a bow, an underside and also including at least one transverse step extending at least partly across the hull underside. The boat hull is characterized in the provision of a venting tube which extends from the transverse step substantially adjacent or contiguous with the hull underside to form an outlet adjacent to the bow. Suitably the venting tube does not communicate with the interior part of the hull and also the venting tube defines at least partly the longitudinal axis of a keel of the boat hull.

9 Claims, 5 Drawing Sheets

BOAT HULL HAVING STEPPED UNDERSIDE

This invention relates to an improved boat hull having a stepped underside.

Hitherto boat hulls have incorporated a hull underside having an intermediate step separating a bow part from a stern part. The provision of such a step was considered advantageous in that it provided a generally raised or elevated stern part relative to the bow part and this enabled water to become less turbulent thereby improving planing efficiency.

A stepped hull of the type discussed above is described in U.S. Pat. No. 4,231,314 which included a transverse step separating a generally V shaped bow part from a generally V shaped stern part. When such a boat is in motion a vacuum is created aft of the step as the water pulls away from the hull. To alleviate this vacuum, air is supplied to this area by external vents located between a pair of continuous chines running from stern to bow. The vents have intakes communicating with the hull interior which are thus open to atmosphere.

The stern part of U.S. Pat. No. 4,231,314 is generally concave on either side of the keel, tapering into a V shape at the transom or stern. This resulted in the hull pivoting longitudinally about the step in the hull, thus cancelling out the pitching action of a rough sea and resulting in a smooth ride. As described in U.S. Pat. No. 4,231,314 previously stepped hulls before the advent of U.S. Pat. No. 4,231,314 comprised a generally flat bow part separated from a generally flat stern part by the transverse step. External vents were located in the chine area of the hull to alleviate the aforementioned vacuum.

A similar boat hull to the prior art described above has also been disclosed in Australian Patent Specification No. 72608/87.

However, the provision of an external vent as proposed in U.S. Patent 4,231,314 overcame this problem to a certain extent. However the venting tube extended vertically upwards and was of a relatively large transverse dimension which reduced the venting effect or suction required. Another factor was that when the craft reversed at slow speeds water sometimes obtained access to the venting tube which was deleterious to the hull interior. The same effect happened when the hull was at rest or travelling at slow speeds in rough or choppy water.

Another disadvantageous factor was that the boat interior was caused to become a relatively low pressure area during boat travel which reduced venting efficiency.

It therefore is an object of the present invention to provide a boat hull having a stepped underside which alleviated the aforementioned problems of the prior art.

The boat hull of the invention has a bow, an underside and also including at least one transverse step extending at least partly across said hull underside characterized in that there is provided a venting tube which extends from said at least one transverse step substantially adjacent or contiguous with the hull underside to form an inlet adjacent to the bow.

Preferably the venting tube does not communicate with an internal part of the hull. It is also preferred that the hull has a hull part having a V shaped bow part and a substantially planar stern part.

It will be appreciated that the invention is applicable not only to monohulls but also multiple hulled boats such as catamarans and trimarans. This will be clearly apparent from preferred embodiments of the invention described hereinafter in relation to the drawings.

The venting tube of the invention may have any cross sectional suitable shape such as being round or circular, rectangular, polygonal or a combination of these shapes. It preferably however has a relatively restricted transverse dimension or transverse cross sectional area. A suitable range of values for the transverse cross sectional area of the venting tube may vary from a lower value of $3\frac{1}{2}\%$ to a maximum value of $5\frac{1}{2}\%$ of the cross sectional area of the outer surface of the transverse step.

It has been found that if the venting tube has a maximum transverse dimension that exceeds the aforementioned maximum value that the suction required to dissipate bow wash as described above may not be as effective as desired. A similar conclusion applies if the minimum transverse diameter of the venting tube is less than the minimum value as above.

It is a particularly preferred arrangement of the present invention that the venting tube be located adjacent to or contiguous with the keel of an associated hull so that it may define at least partly the longitudinal axis of the associated keel. This arrangement is particularly preferred for convenience in boat construction as will also be apparent hereinafter in relation to the discussion of various preferred embodiments of the invention described in regard to the drawings annexed hereto.

Reference may now be made to a preferred embodiment of the invention as illustrated in the accompanying drawings wherein.

Figure 1:
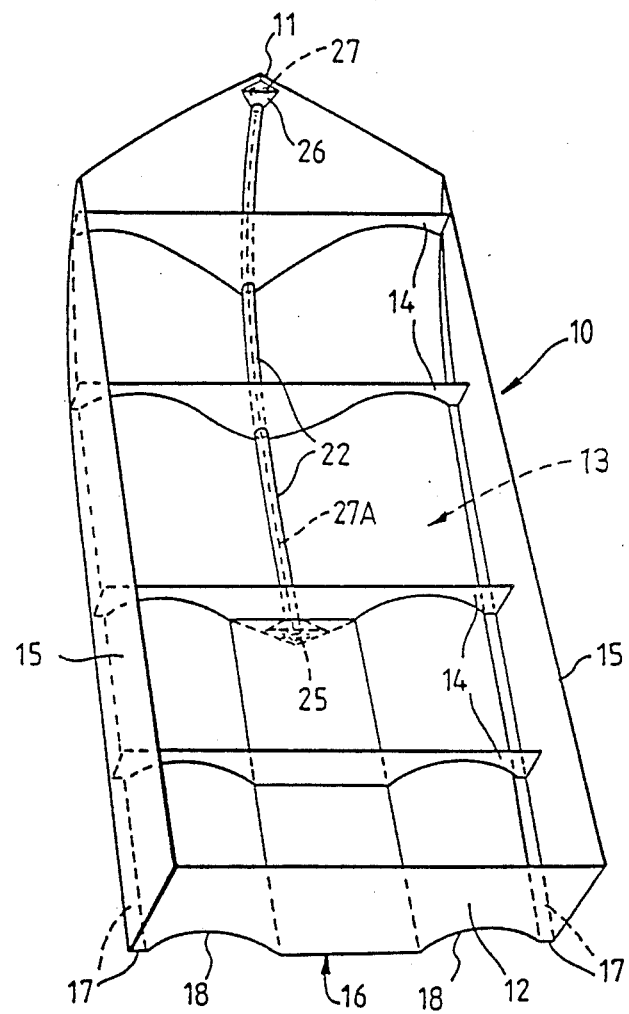
FIG. 1 is a top plan perspective view of a trimaran boat hull constructed in accordance with the invention.

In the drawings, and especially in FIGS 1, 4, 5 and 6, the boat hull 10 includes a bow stern 12, hull interior 13, bulkheads 14, gunnels 15, central hull or central hull portion 16 and outer hull or outer hull portions 17. Also included are longitudinal channels 18. There is also included transverse step 19 which separates central hull 16 into a V shaped bow part 20 and a planar stern part 21. There is also included a venting tube 22 having an outlet end 23 at or adjacent to transverse step 19 and an inlet end located at bow 11. There is also included outlet manifold 24 and outlet ports 25 and inlet manifold 26 and inlet ports 27. Keel 27A of hull 16 is also shown.

Figure 2:
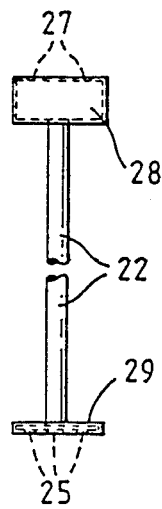
FIGS. 2–3 are alternative views of manifolds for use with both the inlet and outlet ends of the venting tube.
Figure 3:
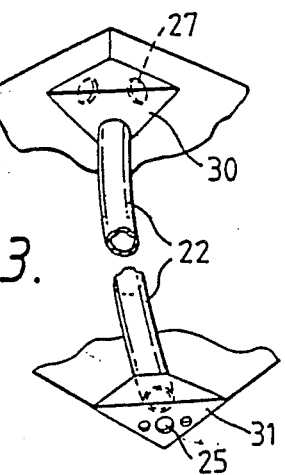
Figure 4:
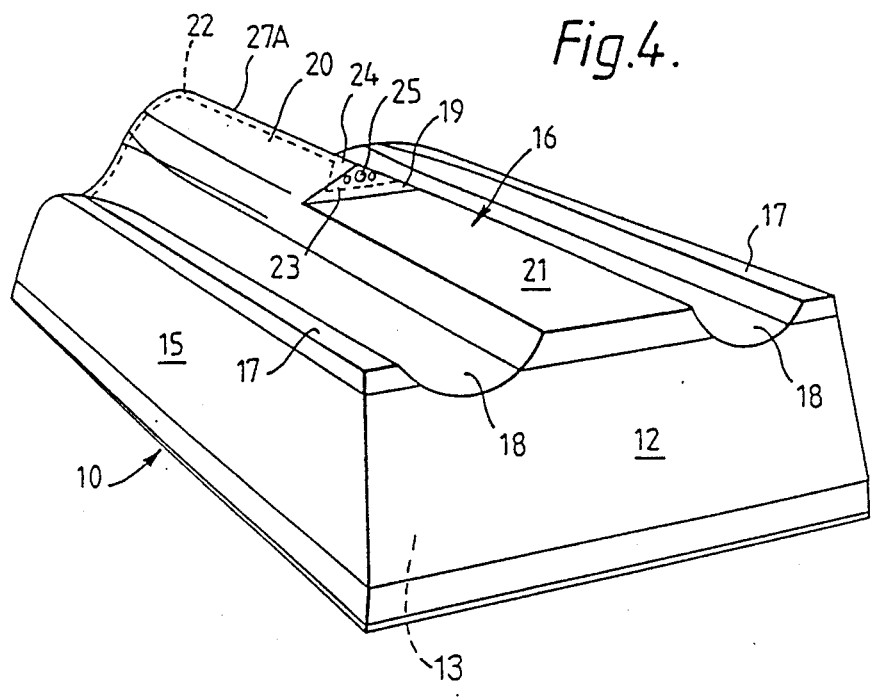
FIG. 4 is a bottom plan perspective view of the trimaran hull shown in FIG 1.
Figure 5:
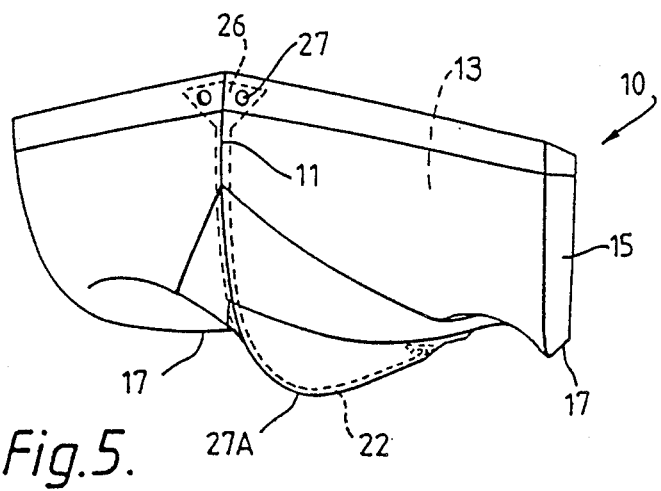
FIG. 5 is a front end view of the hull shown in FIG. 4.
Figure 6:
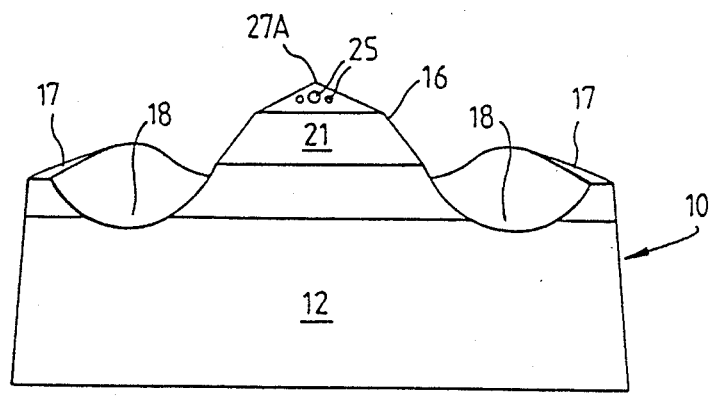
FIG. 6 is a view of the boat hull shown in FIG. 4.

FIGS. 2-3 show alternative forms of manifolds 28, 29, 30 and 31 which may be utilized in regard to venting tube 22. If desired however, the manifolds may be discarded and venting tube 22 only may have an outlet port and inlet port which are defined by the open ends of venting tube 22.

Figure 7:
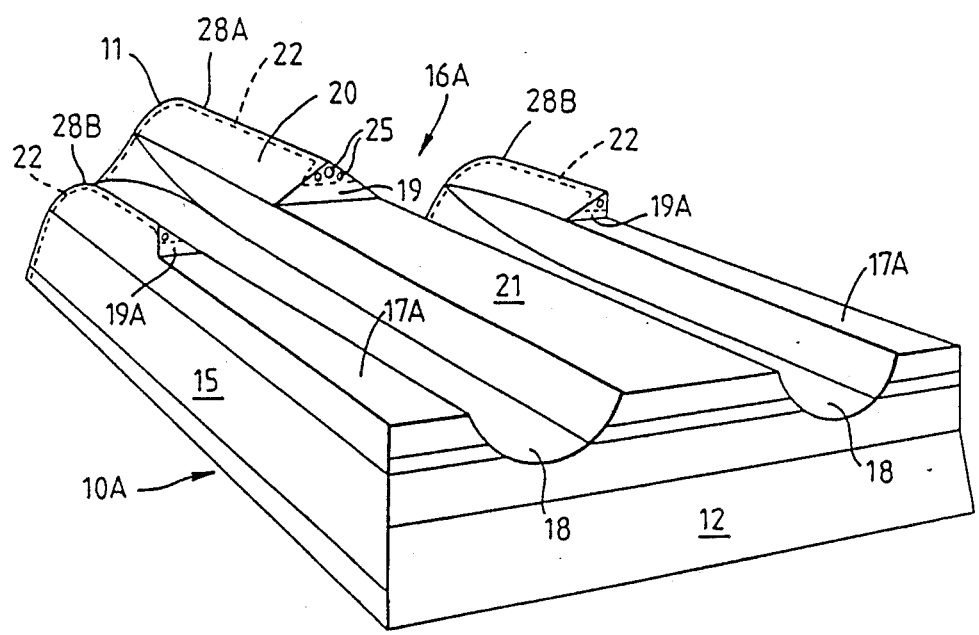
FIG. 7 is a bottom plan perspective view of another type of trimaran constructed in accordance with the invention.
Figure 8:
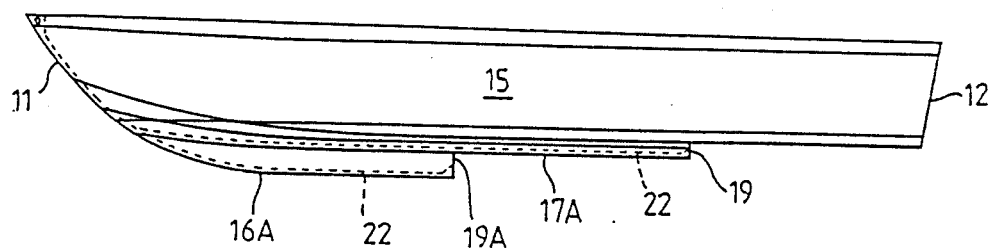
FIG. 8 is a side view of the boat hull shown in FIG. 6.
Figure 9:
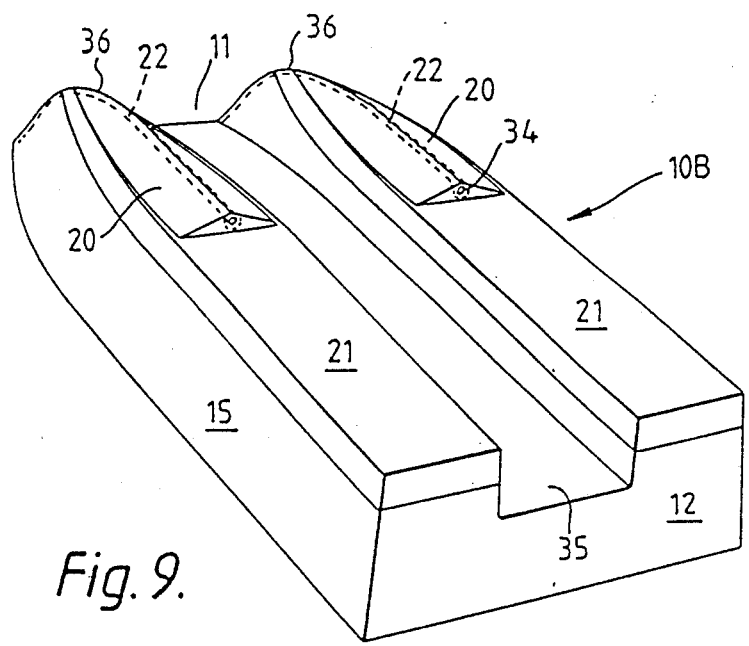
FIG. 9 is a bottom plan perspective view of a catamaran constructed in accordance with the invention.

In the trimaran hull or triple hull 10A shown in FIG. 7, each of the outer hulls 17A is also equipped with a venting tube 22 as well as the central hull 16A. Also each outer hull 17A has a transverse step 19A with the central hull 16A having transverse step 19. FIG. 8 shows a side view of the hull shown in FIG. 7. Central keel 28A and outer keels 28B are also illustrated. In the catamaran hull or double hull 10B shown in FIG. 9 each hull 32 includes transverse step 33 and venting tube 22 having a single outlet port 34. Also shown is central channel 35. Also shown are keels 36 of hulls 32.

Figure 10:
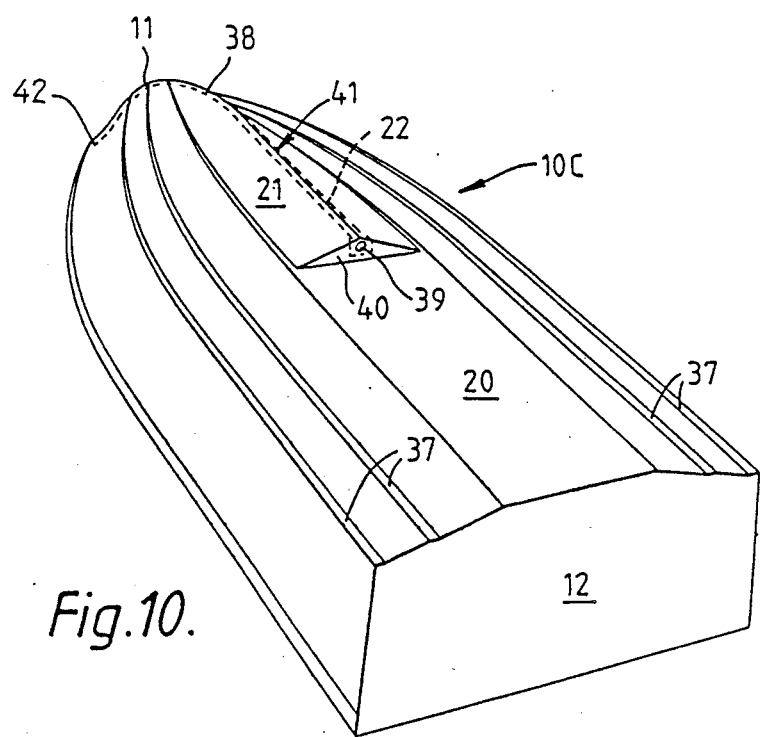
FIG. 10 is a bottom plan perspective view of a single hull constructed in accordance with the invention.

In the single hull or monohull 10C shown in FIG. 10 there is shown planing corrugations 37 as well as keel 38. Venting tube 22 has outlet port 39 and inlet port 42. Transverse step 40 is shown associated with central hull 41.

Figure 11:
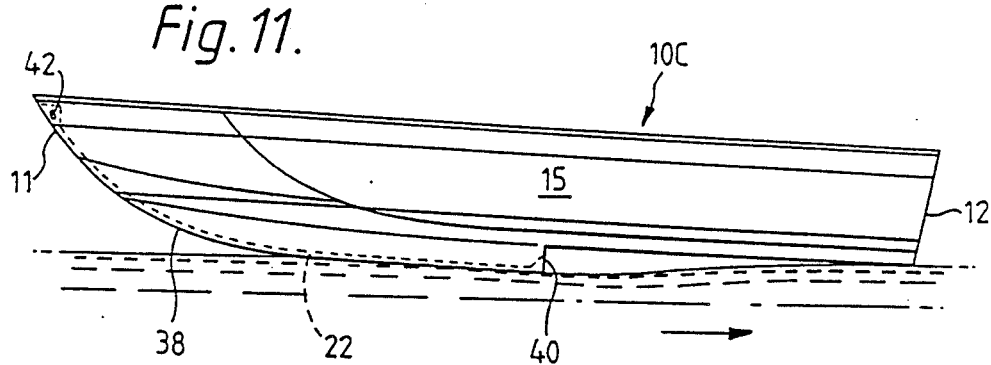
FIG. 11 is a side view of the boat hull of FIG. 4 showing the effect of bow wash when the boat hull is in a planing mode.
Figure 12:
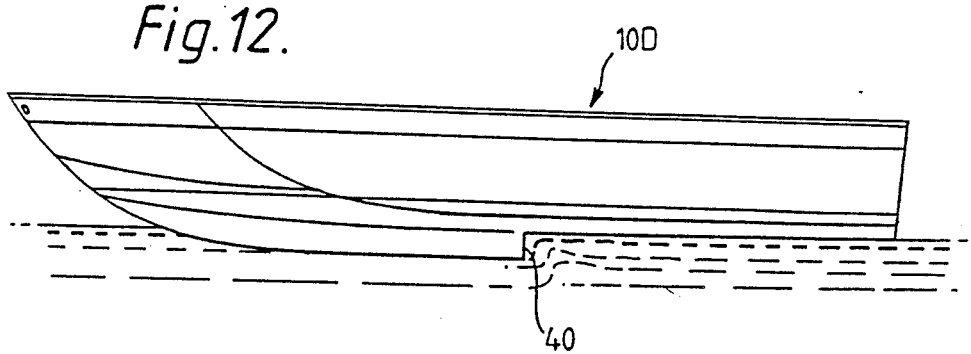
FIG. 12 is a side view of a conventional boat hull showing the effect of bow wash when the boat is in a planing mode.

In FIGS 11-12 the mode of action of venting tube 22 is illustrated. By the provision of venting tube 22 in hull 10C bow wash is substantially eliminated as air is vented through venting tube 22 to the step 40 and expelled to atmosphere through outlet port 39. Water will flow in the direction indicated by the arrow when the boat hull 10C is in a planing mode or when it is travelling forwardly and water does not contact the outer surface of step 40. By contrast as shown in FIG 12 the conventional boat hull 10D not having venting tube 22 will contact the outer surface of transverse step 40 thus providing the problems of bow drag and stern uplift as described previously in regard to the problems associated with the prior art.

The venting tube 22 for the sake of efficiency and also convenience in boat construction is suitably located contiguous with or adjacent the hull undersurface on the bow part of the transverse step which is suitably V shaped so as to form a keel. Preferably the venting tube may be contiguous with or adjacent the keel with the inlet end being formed by the transverse step and the outlet end being formed at the bow on the external surface of the bow and suitably not opening into the boat hull interior.

Thus the venting tube reduces the effect of surface tension or friction, resulting in an increased planing surface and providing a higher speed output while maintaining fuel efficiency, stability and maneuverability. This means that boat hulls in accordance with the invention may be safer to use than conventional craft in storms, squalls and the like. This means that boat hulls constructed in accordance with the invention may be used in the open sea rather than enclosed waters such as lakes or lagoons.

It will also be appreciated that when a boat hull is in a planing mode the bow end of the boat rises at an angle above the water from displacement position. This attitude is retained during planing speed under an applied thrust by the engine. With conventional craft bow wash which is created during travel of the craft is a tremendous energy loss as it may represent the amount of thrust or horsepower used to drive the boat hull forward. Therefore substantial elimination of bow wash clearly provides marked advantages in boating efficiency as described above.

It will also be apparent in the present invention that the provision of a flat or planar stern part 21 means that this stern part 21 is totally underwater or is submerged when the boat hull is in planing. This means that the vacuum created by bow wash is dissipated. This is in contrast with the prior art of Peters wherein the V shaped stern part of the hull underside is not totally submerged and an outermost portion adjacent a respective gunnel on each hole of the hull underside is in non water contact. This means of course that bow wash may still be a problem and that a satisfactory venting effect may not be achieved in that only a partial dissipation of the vacuum created by bow wash may be achieved. Also it will be appreciated that the uppermost point of the transverse step in the present invention will be substantially at the same level as the bottom of the stern as best shown in FIGS 11-12. In other words the lowermost point of the transverse step which is coincident with the keel of the bow part 20 is lower than the bottom of the stern by the height of the transverse step 40. This feature also provides an efficient planing action and achieves substantially total submersion of the stern part 21 with the consequential advantages as set out above.

What is claimed is:

1. A boat hull having a bow, a keel, an underside and also including at least one transverse step extending at least partly across said hull underside characterized in that there is provided a venting tube which extends from said at least one transverse step substantially adjacent to or contiguous with the hull underside and defining at least partly the longitudinal axis of said keel to form an inlet at or adjacent to the bow.

2. A boat hull as claimed in claim 1 wherein said venting tube does not communicate with an interior part of the hull.

3. A boat hull as claimed in claim 1 wherein the venting tube has a relatively restricted transverse dimension or transverse cross sectional area having a lower value of 3 ½% to a maximum value of 5 ½% of the cross sectional area of the outer surface of the transverse step.

4. A boat hull as claimed in claim 1 wherein there is provided at least one hull part having a V shaped bow portion and a substantially planar stern portion.

5. A boat hull as claimed in claim 4 wherein said hull part is centrally located and there is also provided a pair of longitudinal channels wherein each longitudinal channel bounds said centrally located hull part.

6. A boat hull as claimed in claim 5 wherein there is provided a pair of outer hull parts each bounding and located outwardly of a respective longitudinal channel.

7. A boat hull as claimed in claim 6 wherein each of said centrally located hull part and said pair of outer hull parts are provided with said transverse step and said venting tube.

8. A boat hull as claimed in claim 4 wherein there is provided a pair of said hull parts each bounding a respective gunnel and a centrally located longitudinal channel interposed between said hull parts.

9. A boat hull as claimed in claim 1 wherein said venting tube is provided with an outlet manifold or outlet housing including at least one outlet aperture and an inlet manifold or inlet housing including at least one inlet apertures with said venting tube extending between said outlet manifold and said inlet manifold.

* * * * *